United States Patent [19]
Aida et al.

[11] Patent Number: 5,958,813
[45] Date of Patent: Sep. 28, 1999

[54] SEMI-INSULATING ALUMINUM NITRIDE SINTERED BODY

[75] Inventors: Hiroshi Aida; Yumiko Ito; Takero Fukudome; Kazuhiko Mikami, all of Kokubu, Japan

[73] Assignee: Kyocera Corporation, Kyoto, Japan

[21] Appl. No.: 08/978,067

[22] Filed: Nov. 25, 1997

[30] Foreign Application Priority Data

Nov. 26, 1996 [JP] Japan ..................................... 8-314953
Dec. 27, 1996 [JP] Japan ..................................... 8-350075
Mar. 31, 1997 [JP] Japan ..................................... 9-080661

[51] Int. Cl.$^6$ ............................ C04B 35/581; B23Q 3/15
[52] U.S. Cl. ......................... 501/98.4; 501/98.6; 279/128
[58] Field of Search ................................. 501/98.4, 98.6, 501/153; 279/128; 361/234

[56] References Cited

U.S. PATENT DOCUMENTS

| | | | |
|---|---|---|---|
| 4,639,803 | 1/1987 | Takeda et al. ......................... | 501/98.6 |
| 4,997,798 | 3/1991 | Okuno et al. ......................... | 501/98.6 |
| 5,034,357 | 7/1991 | Yamakawa et al. .................... | 501/98.4 |
| 5,312,786 | 5/1994 | Yamakawa et al. .................... | 501/98.4 |
| 5,413,360 | 5/1995 | Atari et al. ............................. | 361/234 |
| 5,443,917 | 8/1995 | Tarry ..................................... | 501/98.4 |

*Primary Examiner*—Michael Marcheschi
*Attorney, Agent, or Firm*—Loeb & Loeb LLP

[57] ABSTRACT

The semi-insulating aluminum nitride sintered body of this invention is composed of aluminum nitride particles, electroconductive fine particles having a volume inherent resistivity value of not larger than $10^2$ $\Omega \cdot cm$ which are dispersed among the aluminum nitride particles and an intergranular phase formed from an oxide containing at least one element selected from the group consisting of Ti, Ce, Ni, Ta, Y, Er and Yb, or from Si. This sintered body has a volume inherent resistivity value of $10^4$ to $10^{11}$ $\Omega \cdot cm$, and is very useful, for example, as a member for removing static electricity, or a dielectric layer of an electrostatic chuck. Since dispersions of volume inherent resistivity values are very small, a material having a volume inherent resistivity value within a certain range can be produced with good reproducibility. Accordingly, the yield is high, and the productivity is very good.

11 Claims, 6 Drawing Sheets

FIG. 9

SEMI-INSULATING ALUMINUM NITRIDE SINTERED BODY

BACKGROUND OF THE INVENTION

1. Field of the Invention

This invention relates to a semi-insulating aluminum nitride sintered body having small variations in volume inherent resistivity values and a small resistance temperature coefficient, and particularly, a semi-insulating aluminum nitride sintered body preferably used in such utilities as members for removing static electricity and an electrostatic chuck.

2. Description of the Prior Art

Among various ceramic sintered bodies, aluminum nitride sintered bodies have a high heat conductivity, and are used in a field which particularly requires a high heat radiatability. Especially in recent years, such sintered bodies have been used as the members for removing static electricity in separating claws for printers, tape guides for guiding magnetic tapes, and conveying arms or vacuum chucks with which an apparatus for producing electronic component parts or a semiconductor apparatus is provided. Furthermore, such sintered bodies have been used as a dielectric layer of the electrostatic chucks for supporting and conveying various articles by electrostatic adsorption forces.

Since the aluminum nitride sintered products are a highly insulated material (at least about $10^{16}$ Ω·cm at room temperature), their inherent resistivity value (to be referred to simply "resistivity value") should be adjusted depending upon uses.

For example, when the aluminum nitride sintered product is used as a member for removing static electricity, its resistivity value must be adjusted to about $10^4$ to $10^8$ Ω·cm.

When it is used as a part comprising an electrostatic chuck, the resistivity value must be adjusted to $10^8$ to $10^{12}$ Ω·cm, especially about $10^8$ to $10^{11}$ Ω·cm at a temperature in the range of room temperature to 100° C., especially −30 to 200° C. As means for adjusting such a resistivity value, it is known that by including an electric conducting material into the aluminum nitride sintered body, its resistivity value can be decreased.

Japanese Laid-Open Patent Publication No. 8089/1994, for example, discloses an aluminum nitride sintered body in which TiN is included in an amount of 5% by weight or below as an electric conducting material. This sintered body has a resistivity value of $10^8$ to $10^{13}$ Ω·cm in a room temperature region. In the following explanation, the volume inherent resistivity value (resistivity value) means a value at room temperature (25° C.) unless specified otherwise.

However, since many of electric conducting materials such as TiN used to decrease the resistivity value have very small volume resistivity value of not larger than $10^2$ Ω·cm, and in addition, exist in the form of particles in the sintered body, aluminum nitride sintered bodies containing such an electric conducting material have a defect in that variations in resistivity value are large. Especially, it is difficult to produce aluminum nitride sintered bodies which have a resistivity value of about $10^4$ to $10^{12}$ Ω·cm required in a member for removing static electricity or electrostatic chucks with good reproducibility, and there is a problem in that the yield is poor.

For example, if the content of the electric conducting material is increased, the electric conducting materials are united with each other, and an abrupt decrease occurs in the resistivity value. Therefore, variations in the resistivity values become large, and it is difficult to obtain sintered bodies having an intended resistivity value. Furthermore, if the content of the electric conducting material is reduced, it is impossible to form a sufficient conductive passage within the inside of the aluminum nitride sintered body, and it is difficult to lower the resistivity of the sintered body. In addition, since a sufficient conductive passage is not formed, the resistivity values vary greatly due to changes in temperature. As a result, inconvenience occurs in that an aluminum nitride sintered body cannot be used effectively this way in a narrow temperature range.

SUMMARY OF THE INVENTION

It is an object of this invention to provide a semi-insulating aluminum nitride sintered body having small variations of resistivity values and small changes in resistivity values due to temperature changes.

It is another object of this invention to provide a semi-insulating aluminum nitride sintered body in such utilities as members for removing static electricity, or electrostatic chucks, especially preferably for such utilities as electrostatic chucks.

The present inventors have found that in an aluminum nitride sintered body having electroconductive particles dispersed among aluminum nitride particles, by forming an intergranular phase composed of an oxide of a specific element, dispersions of the resistivity value are suppressed, and changes of resistivity value due to temperature changes can be controlled to small values.

According to this invention, there is provided a semi-insulating aluminum nitride sintered body composed of aluminum nitride particles, electroconductive fine particles having a volume inherent resistivity value of not larger than $10^2$ Ω·cm which are dispersed among the aluminum nitride particles, and an intergranular phase formed from an oxide containing at least one element selected from the group consisting of Ti, Ce, Ni, Ta, Y, Er and Yb, or from metallic silicon (Si).

DETAILED DESCRIPTIONS OF THE INVENTION

Structure of a Sintered Body

Figure 1:
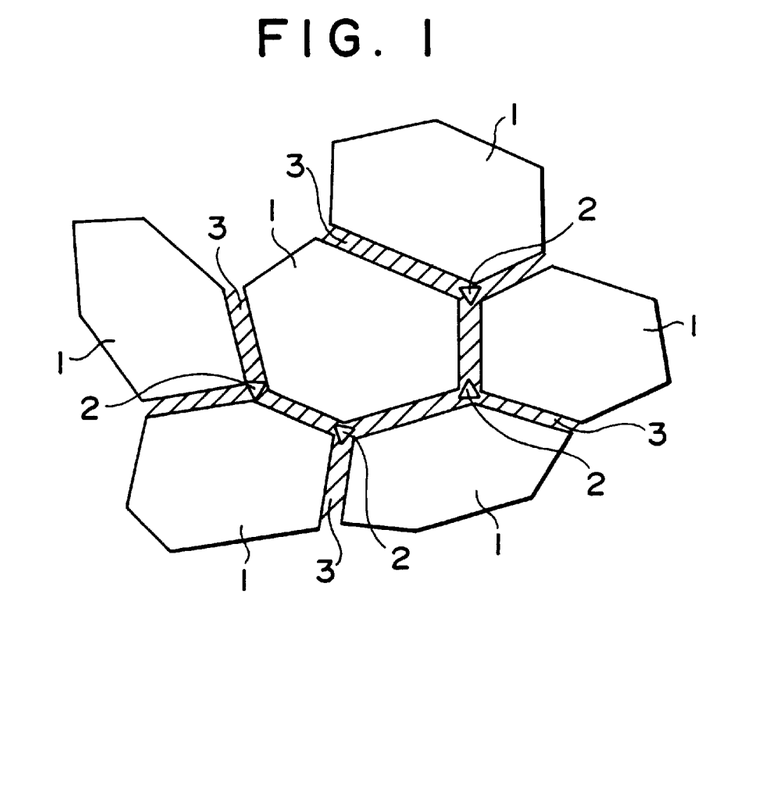
FIG. 1 is a view showing a crystal structure of the semi-insulating aluminum nitride sintered body of this invention.

Referring to FIG. 1 showing the crystal structure of the semi-insulating aluminum nitride sintered body of this invention, this sintered body is composed of aluminum nitride crystalline particles 1, electroconductive fine particles 2 dispersed among the particles 1, and an intergranular phase 3.

The aluminum nitride particles 1 constitute a main phase of this sintered body. These aluminum nitride particles 1 may generally be contained in an amount of at least 52% by volume, especially in an amount of at least 55% by volume, most preferably in an amount of at least 65% by volume, based on the sintered produce, although the amount of the particles 1 may differ depending upon the use of the sintered product. Preferably, the average crystal particle diameter of the aluminum nitride particles 1 is in the range of 2 to 50 $\mu$m, especially in the range of 5 to 30 $\mu$m. If the average crystal particle diameter of the aluminum nitride particles 1 is larger than 50 $\mu$m, the dispersion of the electroconductive fine particles 2 becomes poor, and the strength or hardness of the sintered body is drastically decreased. Furthermore, it is difficult to produce the crystal particle having the average particle diameter of smaller than 2 $\mu$m.

The electroconductive fine particles 2 have a volume inherent resistivity value of $10^2$ $\Omega$·cm or below. Examples of these fine particles 2 include titanium, carbide (TiC, about 180 $\mu\Omega$·cm), titanium nitride (TiN, about 21.7 $\mu\Omega$·cm), tantalum nitride (TaN, about 135 $\mu\Omega$·cm), tungsten carbide (WC, about 80 $\mu\Omega$·cm) and carbon (C, about $4.3 \times 10^{-3}$ $\Omega$·cm). The most preferably used electroconductive fine particles 2 are composed of titanium nitride.

In accordance with this invention, by dispersing the electroconductive fine particles 2 among the aluminum nitride particles 1, it can be attempted to lower the resistance of the sintered body. Preferably, the electroconductive fine particles 2 have a particle diameter of 0.5 to 3.0 $\mu$m in order to disperse them uniformly among the aluminum nitride particles 1. The proportion of the electroconductive fine particles 2 in the sintered body varies depending upon the kind of particle diameter, but usually is in the range of 5 to 45% by volume. If the proportion of the fine particles 2 is less than 5% by volume, it is difficult to lower the resistivity of the sintered body, and also to decrease the resistance temperature coefficient of the sintered body. If the proportion exceeds 45% by volume, depending upon the kind or particle diameter, the electroconductive fine particles 2 are united locally, a portion in which the resistivity value abruptly decreases is developed, and the variations of the resistivity value of the sintered body becomes large. Accordingly, by adjusting the content of the electroconductive fine particles 2 within the above-mentioned range, it is possible to produce a sintered body having a resistivity value in the range of $10^4$ to $10^{12}$ $\Omega$·cm, especially $10^{-4}$ to $10^{-11}$ $\Omega$·cm.

The intergranular phase 3 is formed from an oxide containing at least one element selected from the group of titanium (Ti), cerium (Ce), nickel (Ni), tantalum (Ta), yttrium (Y), erbium (Er) and ytterbium (Yb), or from metallic silicon (Si). The intergranular phase 3 formed from such an oxide or Si has a volume inherent resistivity value midway between the aluminum nitride particles 1 and the electroconductive fine particles 2. By forming the intergranular phase 3, an always stable electroconductive passage is formed among the aluminum nitride particles 1. At the same time, linking among the electroconductive fine particles 2 is prevented, and an abrupt lowering of the resistivity value is suppressed. Accordingly, in the sintered body of this invention, variations of resistivity values are very small and the resistivity temperature coefficient is small. Furthermore, variations of the resistivity value due to a temperature change are very small, and it is possible to adjust the resistivity value to $10^{12}$ $\Omega$·cm or below at a temperature of 200° C. for example, and at times at a temperature of 230° C.

The intergranular phase 3 can be formed by mixing the oxides of the elements, namely at least one of $TiO_2$, $CeO_2$, NiO, $Ta_2O_3$, $Er_2O_3$, and $Yb_2O_3$, or metallic silicon obtained by reducing $SiO_2$ with the aluminum nitride powder and the electroconductive powder, and sintering the resulting mixture. By firing, the oxide etc. forms a liquid phase, and the liquid phase itself, or a part of the liquid phase is reacted with the aluminum nitride particles or the electroconductive fine particles to form an intergranular phase 3. Therefore, in the sintered product, the above-mentioned elements exist in the form of $TiO_{2-x}$, $CeAlO_3$, $NiO_{1-x}$, $Ta_2O_{3-x}$, $YAlO_3$, $ErAlO_3$, $YbAlO_3$ or Si.

The proportion of the intergranular phase 3 in the sintered body differs depending upon the types of the element constituting the intergranular phase 3 or the utility of the sintered body, but preferably generally it is at least 0.1% by volume, especially at least 1% by volume. If the proportion of the intergranular phase 3 is less than 0.1% by volume, variations of the resistivity value cannot be sufficiently reduced, and it is difficult to suppress the resistivity value due to the temperature change to a small degree. Further, the liquid phase may not flow out at the time of firing. From this standpoint, the amount should generally by 15% by volume or below.

When the sintered body is used as a dielectric layer of the electrostatic chuck, there are preferred combinations between the electroconductive fine particles 2 and the intergranular phases.

Examples of preferred combinations are shown in the following table although not limited to the following examples.

| (Production of a sintered body) | |
| --- | --- |
| Electroconductive fine particles 2 | Intergranular phase 3 |
| TiN | Y, Er, Yb |
| 12 to 40% by volume | 1 to 8% by volume |
| TiN | Ni |
| 5 to 18% by volume | 0.1 to 10% by volume |
| TiN | Ce |
| 10 to 30% by volume | 2 to 10% by volume |

The semi-insulating aluminum nitride sintered body is produced by mixing an AlN powder, an electroconductive powder and various oxides or metallic silicon (Si) constituting an intergranular phase in predetermined proportions, adding a binder and a solvent, molding the mixture in a predetermined shape, eliminating the solvent and the binder by vacuum-degreasing, and firing the molded product. Of course, a sintering aid may be added to the above mixture, as required. The starting AlN powder has a purity of at least 99%, and an average particle diameter of 3 $\mu$m or below.

The molding can be performed by known ceramic molding means such as a casting method, an extrusion molding method and a tape molding method. The above-mentioned mixture is dried and granulated to form granules, filling the granules into a mold, and molding the granules by a mold pressing method or a rubber pressing method. After molding in this way, the molded product may be machined as required.

The firing may be carried out usually in a non-oxidizable atmosphere at a temperature of 1800 to 2100° C. for 1 to several hours.

Utilities

The resulting semi-insulating aluminum nitride sintered body has a volume inherent resistivity values of $10^4$ to $10^{12}$ $\Omega\cdot cm$, especially $10^4$ to $10^{11}$ $\Omega\cdot cm$, and has a small resistivity temperature coefficient. Accordingly, the sintered body is very useful as a member for removing static electricity, or as a dielectric layer of an electrostatic chuck. For example, when the sintered body of this invention is used as a member for removing static electricity in a conveying arm or a vacuum chuck used in an apparatus for producing various electronic component parts or a semiconductor apparatus, a separating claw of a printer, or a tape guide for guiding a magnetic tape, static electricity can be gradually vented, and thus, poor handling accidents due to short-circuiting in continuity can be effectively prevented. Especially, the sintered body in which the electroconductive fine particles and the intergranular phase are combined most preferably for use in an electrostatic chuck as stated above, has a volume inherent resistivity value of $10^8$ to $10^{12}$ $\Omega\cdot cm$ in a temperature range of room temperature to 100° C., especially −30 to 200° C., and some of these sintered bodies have a volume inherent resistivity value of $10^{12}$ $\Omega\cdot cm$ or below even at a temperature of 230° C. Accordingly, the electrostatic chuck having this sintered body has a dielectric layer can give a high electrostatic adsorption strength over a wide temperature range from a low temperature range to a high temperature range.

As shown in the following examples, since the sintered body of this invention has very small variations in resistivity, it has good reproducibility and it is possible to produce a sintered body having the intended resistivity value. Thus, the yield is increased, and this sintered body has extremely excellent productivity.

Electrostatic Chuck

Figure 2:
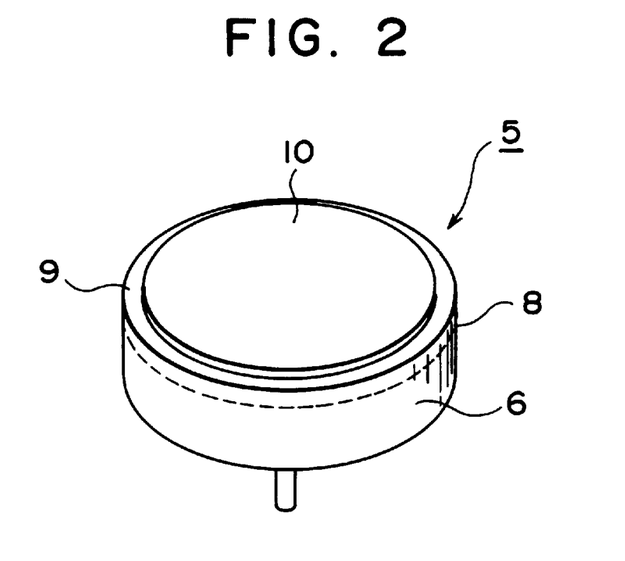
FIG. 2 is a perspective view of one example of the structure of an electrostatic chuck.
Figure 3:
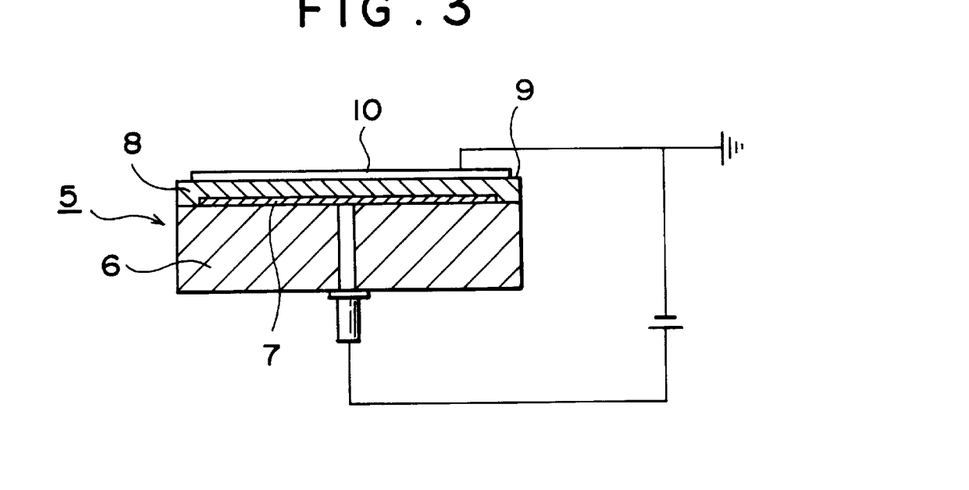
FIG. 3 is a side cross-sectional view of the electrostatic chuck of FIG. 2.

One example of the electrostatic chuck constructed by using the above-mentioned semi-insulating aluminum nitride sintered body is shown in the perspective view of FIG. 2 and the vertical cross-sectional view of FIG. 3.

As shown in these drawings, an electrostatic chuck shown at 5 on the whole is constructed from an insulating ceramic base plate 6, an electrostatic adsorption electrode 7 formed on the surface of the base plate 6, and a dielectric layer 8 provided to cover the electrode 7. The upper surface of the dielectric layer 8 acts as an adsorption surface 9. A predetermined article (such as a semiconductor wafer) 10 is adsorbed and held on the adsorption surface 9 by an electrostatic adsorptive force.

The above-mentioned ceramic base plate 6 is composed of an insulating ceramic such as alumina, silicon nitride, or aluminum nitride. The dielectric layer 8 is composed of the above-mentioned semi-insulating aluminum nitride sintered body. The ceramic base plate 6 and the dielectric layer 8 are integrated by sintering.

Incidentally, in the semiconductor producing step, an electrostatic chuck is used to hold a semiconductor wafer in an etching step carried out in a low temperature atmosphere at −30° C. to 0° C., a film-forming step carried out in an atmosphere at about 200° C., and an exposure treatment step carried out in an atmosphere at room temperature (about 25° C.). The electrostatic adsorption force includes two kinds of forces, namely a Coulomb's force and a Johnson-Rahbeck force. The Coulomb's force depends upon the dielectric constant of a material constituting the dielectric layer, and the Johnson-Rahbeck force depends upon the volume inherent resistivity value of a material constituting the dielectric layer. Specifically, when the resistivity value of the dielectric layer is at least $10^{15}$ $\Omega\cdot cm$, the electrostatic adsorption force is dominated by the Coulomb's force, and as the resistivity value becomes lower, the Johnson-Rahbeck force is manifested. When the resistivity value becomes lower than $10^{12}$ $\Omega\cdot cm$, the Johnson-Rahbeck force becomes dominant. On the other hand, the volume inherent resistivity value of the ceramic decreases as the temperature rises, and in the case of aluminum nitride, its volume inherent resistivity value is about $10^{11}$ $\Omega\cdot cm$ at a temperature of at least 300° C. Accordingly, in the electrostatic chuck having aluminum nitride as a dielectric layer, a high electrostatic adsorption force due to the Johnson-Rahbeck can be obtained at a temperature of at least 300° C. However, aluminum nitride has a very high volume inherent resistivity value of at least $10^{16}$ $\Omega\cdot cm$ at room temperature (25° C.), and within this low-temperature range, there can be obtained only an adsorption force due to the Coulomb's force. Furthermore, its resistivity value at about 200° C. is considerably larger than $10^{12}$ $\Omega\cdot cm$, and the dielectric constant is not so high. Accordingly, in the electrostatic chuck having aluminum nitride as a dielectric layer, it is impossible to obtain a sufficient adsorption force at a temperature of not higher than 200° C., and its use in the step of producing a semiconductor has a problem. When a wafer having distortions is adsorbed, the entire surface of the wafer cannot be caused to abut on the adsorption surface. The flattening or the incandescing of the wafer is damaged, and as a result, it is impossible to form a thin film having a uniform thickness in a film-forming step. It is further impossible to perform a treatment with a good accuracy in an exposing treatment step or an etching step.

However, in the electrostatic chuck 5 of this invention, the dielectric layer 8 is formed from the above-mentioned aluminum nitride sintered body. This sintered body has a resistivity value within ranges of $10^8$ to $10^{12}$ $\Omega\cdot cm$ at a temperature of room temperature to 100° C. especially −30 to 200° C., and may have a resistivity value of not larger than $10^{12}$ $\Omega\cdot cm$ at a temperature of 230° C. Accordingly, it is possible to manifest an adsorption force due to the Johnson-Rahbeck force in a wide range of temperatures used in each step of the process for production of semiconductors. An article 10 such as a silicon wafer can be firmly adsorbed and held onto the adsorption surface 9. Accordingly, even if an article to be adsorbed and fixed is a base plate such as a semiconductor wafer having a warping, it can be exactly adhered and held to the adsorption surface 9. By using the electrostatic chuck 5, for example, in the step of exposure treatment, exposure treatment can be performed with a good accuracy level.

In addition, when conducting to the voltage for electrostatic adsorption electrode 7 is OFF, the adsorption force can be immediately removed. Therefore, the electrostatic chuck 5 is very good in respect of elimination and response.

Furthermore, since the ceramic base plate 6 and the dielectric layer 8 are integrated by sintering in this electrostatic chuck 5, it can be used at a temperature of, for example, at least 200° C. Since the entire electrostatic chuck 5 is composed of ceramics having high resistance to plasma or a corrosive gas, it can be used without hindrance in the film-forming step or the etching step.

The ceramic base plate 6 should preferably be composed of an aluminum nitride sintered body. By so doing, a heat expansion difference between the dielectric layer 8 and the ceramic base plate 6 can be removed, and it is possible to prevent effectively the generation of a warp or a distortion by firing. As a result, an electrostatic chuck having high reliability can be obtained.

In the electrostatic chuck 5 shown in FIGS. 2 and 3, a heater electrode can be embedded in the ceramic base plate 6. When in this state, a current is passed through the heater electrode, the article 10 held on the adsorption surface 9 can be immediately heated. There is an advantage that a heating unevenness of the article 10 can be prevented. If an electrode for the generation of a plasma is embedded in the ceramic base plate 6, there is an advantage that the thin film-forming step can be performed by an apparatus having a simple structure.

Figure 4:
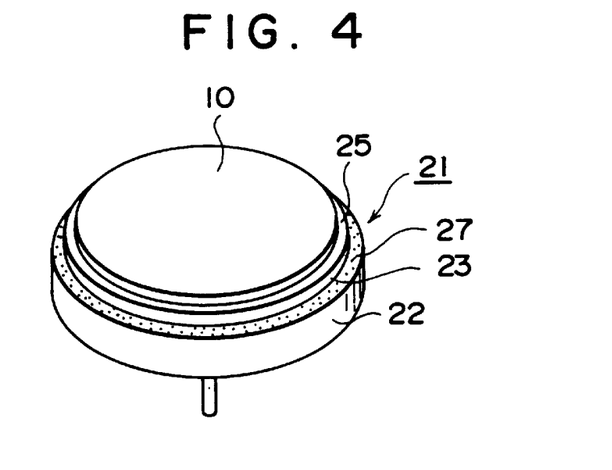
FIG. 4 is a perspective view of another example of the structure of an electrostatic chuck.
Figure 5:
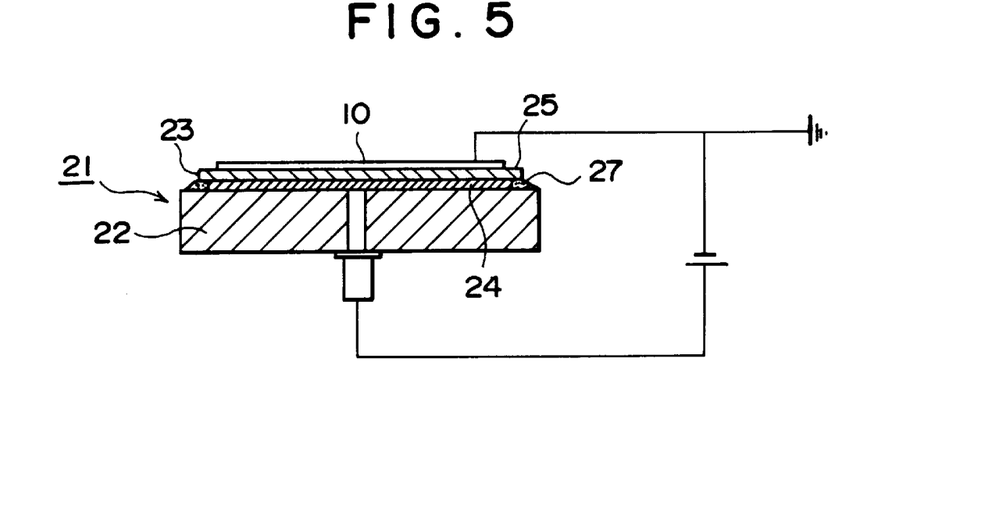
FIG. 5 is a side cross-sectional view of the electrostatic chuck of FIG. 4.

FIGS. 4 and 5 show a perspective view and a side cross-sectional view of another example of the electrostatic chuck of this invention. In the electrostatic chuck 21 of this example, an upper surface of a dielectric layer 23 composed of the above-mentioned semi-insulating aluminum nitride sintered body acts as an adsorption surface 25. An article 10 such as a semiconductor wafer is adsorbed and held onto the adsorption surface 25. A plate-like base plate 22 is provided below the dielectric layer 23. This base plate 22 is composed of an insulating ceramic such as alumina, silicon nitride or aluminum nitride, or a resin. Between the dielectric layer 23 and the base plate 22, an electrode 24 for electrostatic adsorption is embedded by a cementing material 27 such as a solder or a metalized agent. This electrostatic chuck 21 can manifest a high adsorption force within a wide temperature range and has an advantage that especially the dielectric layer 23, the electrode 24 for electrostatic adsorption and the base plate 22 may be separately formed and assembled and the electrostatic chuck can be produced very simply from these parts.

In FIGS. 2 to 5, a single pole-type electrostatic chuck is shown as an example, but the present invention can be also applied to a hyperbolic type electrostatic chuck.

The present invention will be explained by its following Examples.

EXAMPLE 1

To 63% by volume of AlN powder having an average particle diameter of 1.2 μm and a purity of 99% were added 30% by volume of TiN having an average particle diameter of 1.6 μm and 4% by volume of $CeO_2$ having an average particle diameter of 0.9 μm and a binder and a solvent were added. The resultant slurry was used, and by using a doctor blade method, a green sheet having a thickness of about 0.5 mm was prepared. The green sheet was vacuum degreased, and was fired at a temperature of about 2000° C. in a nitrogen atmosphere for 1 to several hours to obtain a semi-insulating aluminum nitride sintered body in which titanium nitride as electroconductive particles was dispersed among aluminum nitride particles (AlN) and an intergranular phase comprising a reaction product ($CeAlO_3$) between cerium oxide ($CeO_2$) and aluminum nitride (AlN) was formed. When the resistivity value of a reaction product ($CeAlO_3$) prepared from cerium oxide ($CeO_2$) and aluminum nitride (AlN) (intergranular phase) was measured, the result was midway between AlN and TiN.

Ten aluminum nitride sintered bodies prepared by the above method were provided. The volume inherent resistivity values of these samples were measured by a three terminal method. It was found that these samples had a resistivity value of $9 \times 10^9$ Ω·cm on an average at room temperature (25° C.), and its variation was about ±10%.

When the resistivity temperature coefficient at a temperature range of from room temperature (25° C.) to 50° C., the change of the resistivity value was within as small as one figure.

The volume inherent resistivity value was calculated by the following formula (1), the dispersion of the volume inherent resistivity value was calculated by the following formula (2), and the resistivity temperature coefficient was calculated by the following formula (3).

$$\text{Volume inherent resistivity value} = \frac{(\rho_{max} + \rho_{min})}{2} [\Omega \cdot cm] \quad (1)$$

$\rho_{max}$ = the maximum value of the volume inherent resistivity;

$\rho_{min}$ = the minimum value of the volume inherent resistivity.

$$\text{variation of volume inherent resistivity value} = \quad (2)$$

$$\frac{(\rho_{max} - \rho_{min})}{(\rho_{max} + \rho_{min})} \times 100 \ [\%]$$

$\rho_{max}$ = the maximum value of the volume inherent resistivity;

$\rho_{min}$ = the minimum value of the volume inherent resistivity.

$$\text{Resistivity temperature coefficient} = \frac{\rho[25°C.]}{\rho[50°C.]} \quad (3)$$

$\rho[25°X.]$ = the volume inherent resistivity at room temperature (25°C.)

$\rho[50°C.]$ = the volume inherent resistivity value at 100°C.

EXAMPLE 2

To 70% by volume of AlN powder having an average particle diameter of 1.2 μm and a purity of 99% were added 25% by volume of the TiN having an average particle diameter of 1.6 μm and 5% by volume of $TiO_2$ having an average particle diameter of 0.8 μm, and as a sintering aid 2% by volume of $Y_2O_3$ having an average particle diameter of 0.9 μm was added. Furthermore, a binder and a solvent were added. By using the resulting slurry, a green sheet having a thickness of about 0.5 mm was formed by a doctor blade method. Thereafter, the green sheet was vacuum degreased, and then fired at about 2000° C. in a nitrogen atmosphere for about 1 to several hours to obtain a semi-insulating aluminum nitride sintered body in which titanium nitride (TiN) as electric conductive particles were dispersed among aluminum nitride (AlN) particles and which had an intergranular phase composed of $TiO_{2-x}$. When the resistivity of $TiO_{2-x}$ was measured, the result was midway between AlN and TiN.

Ten aluminum nitride sintered bodies prepared by the above method were provided, and the volume inherent resistivity values of these samples were measured by a three terminal method. They had a resistivity value of $5 \times 10^9$ Ω·cm on an average, and the variation was about ±8%. Furthermore, when the resistivity temperature coefficients of these samples were measured in a temperature region of from room temperature 25° C.) to 50° C., the change of the resistivity value was within as small as one figure.

EXAMPLE 3

To 80% by volume of AlN powder having a purity of 99% and an average particle diameter of 1.2 μm were added 20% by volume of TiN having an average particle diameter of 1.6 μm, 0.1% by volume of NiO having an average particle diameter of 0.8 μm and 3% by volume of $Al_2O_3$ as an aid. Furthermore, a binder and a solvent were added. By using the resulting slurry, the mixture was granulated by a spray dryer to form granules, and the granules were filled in a mold to form a disk-like product having a thickness of about 4 mm by a mechanical pressing method. This molded product was vacuum degreased, and thereafter, was fired at a temperature of about 1820° C. in a nitrogen atmosphere for 1 to several hours to give a semi-insulating aluminum nitride sintered body in which titanium nitride (TiN) as electroconductive particles was dispersed among aluminum nitride (AlN) particles, and which contained an intergranular phase composed of $NiO_{1-x}$. When the resistivity value of the intergranular $NiO_{1-x}$ was measured, the result was midway between AlN and TiN.

Ten aluminum nitride sintered bodies prepared by the above method were provided, and their volume inherent resistivity values were measured by a three terminal method. It was found that these sintered bodies had an average resistivity value of $4 \times 10^4$ Ω·cm at room temperature (25° C.)., and the variation of the resistivity values was about ±6%. Furthermore, when the resistivity temperature coefficients from a temperature range of room temperature (25° C.) to 50° C., the change of the resistivity value was within as small as one figure.

EXAMPLE 4

By variously changing the amounts of the particles, ten semi-insulating aluminum nitride sintered bodies consisting of aluminum nitride particles, TiN particles dispersed among the AlN particles, and an intergranular phase derived from $CeO_2$ were produced.

The volume inherent resistivity values, the variations of the volume inherent resistivity values, and the resistivity temperature coefficients from room temperature (25° C.) to 50° C. of these sintered bodies were measured. Incidentally, the volume inherent resistivity values, the variations of the volume inherent resistivity values and the resistivity temperature coefficients were calculated in accordance with the formulae (1) to (3). Also, in the sintered bodies having resistivity value of not smaller than $10^6$ Ω·cm, the dielectric constants were measured.

The compositions of these samples and the results are shown in Table 1.

TABLE 1

| No. | AlN particles content (vol. %) | TiN particles content (vol. %) | $CeO_2$ content (vol. %) | Volume inherent resistivity values [25° C.] (Ω · cm) | Dispersions of resistivity (%) | Resistivity temperature coefficient $R_{25}/R_{50}$ | Dielectric constant |
|---|---|---|---|---|---|---|---|
| 1 | 85 | 5 | 10 | $10^8$ | 9 | 6.8 | 10 |
| 2 | 80 | 15 | 5 | $9 \times 10^{10}$ | 10 | 9.7 | 15 |
| 3 | 81 | 12 | 10 | $5 \times 10^5$ | 5 | 4.6 | — |
| 4 | 75 | 15 | 10 | $2 \times 10^5$ | 4 | 5.1 | — |
| 5 | 75 | 20 | 5 | $7 \times 10^8$ | 6 | 7.2 | 23 |
| 6 | 70 | 25 | 5 | $3 \times 10^9$ | 7 | 5.8 | 48 |
| 7 | 68 | 30 | 2 | $4 \times 10^9$ | 8 | 6.6 | — |
| *8 | 50 | 48 | 2 | 3 | 79 | 2.3 | — |
| *9 | 85 | 15 | — | $6 \times 10^7$ | 99.9 | 12 | 14 |
| *10 | 80 | 20 | — | $3 \times 10^4$ | 99.8 | 6.5 | — |
| *11 | 72 | 28 | — | $2 \times 10^3$ | 98 | 4.9 | — |

*indicates outside the range of this invention

As a result, since samples Nos. 9 to 11 do not contain $CeO_2$ and thus do not have an intergranular phase 3 composed of $CeAlO_3$, they have a variation of at least ±98% in their volume inherent resistivity values, and possess poor reproducibility. Sample No. 11 has a small volume inherent resistivity value of less than $10^4$ Ω·cm. Sample No. 9 has a resistivity temperature coefficient of 12, and the change of the resistivity value cannot be controlled within one figure.

Furthermore, Sample No. 8 contained $CeO_2$ constituting the intergranular phase, but contained aluminum nitride in an amount of less than 55% by volume and TiN particles in an amount of larger than 45% by volume. Therefore, this sample had a volume inherent resistivity value of as small as 3 Ω·cm, and had a small effect of suppressing the variation of the resistivity value and showed a variation of the resistivity of ±79%.

On the other hand, since Samples Nos. 1 to 7 contained $CeO_2$, also contained an intergranular phase 3 composed of $CeAlO_3$ and had TiN particles in an amount of 5 to 45% by volume, the volume inherent resistivity value could be adjusted to $10^4$ to $10^{11}$ Ω·cm to form a semi-insulating aluminum nitride sintered body. Furthermore, the variation of the resistivity value can be controlled to 10% or below. In addition, the resistivity temperature coefficient was small, and the change of the resistivity value could be made small within one figure.

Thus, it can be seen that in addition to electroconductive particles having a volume inherent resistivity value of $10^2$ Ω·cm or below, by forming an intergranular phase having a resistivity value midway between the aluminum nitride particles and the electroconductive particles, a semi-insulating aluminum nitride sintered body having a volume inherent resistivity value of about $10^4$ to $10^{11}$ Ω·cm, which has been difficult to obtain heretofore, could be produced with good reproducibility, and the change of the resistivity value to a temperature change could be decreased.

EXAMPLE 5

By using aluminum nitride particles and TiN particles, and further using TiO, $CeO_2$, NiO, $Ta_2O_3$ or Si as a third component constituting an intergranular phase, ten semi-insulating aluminum nitride sintered bodies were prepared by respectively, and in the same way as in Example 4, the volume inherent resistivity values, the variations of the volume inherent resistivity values, and the resistivity temperature coefficients at room temperature (25° C.) to 50° C. of these samples were measured. The compositions of these samples, and the results are shown in Table 2.

TABLE 2

| No. | AlN particles content (vol. %) | TiN particles content (vol. %) | The third component content (vol. %) | Intergranular phase in the sintered body | Volume inherent resistivity value [25° C.] (Ω · cm) | Dispersion of the resistivity value (%) | Resistivity temperature coefficient ($R_{25}/R_{50}$) |
|---|---|---|---|---|---|---|---|
| 12 | 70 | 25 | $TiO_2$: 5 | $TiO_{2-x}$ | $5 \times 10^9$ | 8 | 7.2 |
| 13 | 73 | 17 | $CeO_2$: 10 | $CeAlO_3$ | $3 \times 10^8$ | 7 | 6.6 |
| 14 | 78 | 15 | NiO: 7 | $NiO_{1-x}$ | $2 \times 10^6$ | 5 | 4.3 |
| 15 | 80 | 15 | $Ta_2O_5$: 5 | $Ta_2O_{5-x}$ | $5 \times 10^7$ | 4 | 5.5 |
| 16 | 81 | 15 | Si: 4 | Si | $8 \times 10^4$ | 6 | 4.0 |

As a result, since any of these aluminum nitride sintered bodies comprise an intergranular phase composed of Si or an oxide of at least one of Ti, Ce, Ni and Ta and having a resistivity value midway between AlN and TiN, the volume inherent resistivity values of the sintered bodies can be adjusted to $10^4$ to $10^{11}$ Ω·cm, namely semi-insulating, and the variation of the volume inherent resistivity value can be controlled to below 10%. Furthermore, the resistivity temperature coefficient is small, and the change of the resistivity value can be decreased within one figure.

EXAMPLE 6

The electrostatic chuck 5 having the structure shown in FIGS. 2 and 3 was produced in the following manner.

Only a binder and a solvent were added to AlN powder having a purity of 99% and an average particle diameter of 1.2 μm. By using the resulting slurry, a plurality of green sheets (for forming ceramic base plates 6) having a thickness of about 0.5 mm were molded by a doctor blade method and laminated, and a tungsten paste containing AlN powder was spread on one surface of the green sheet by a screen printing machine to form a metallic film constituting an electrostatic adsorption electrode 7.

On the other hand, to 75% by volume of AlN powder having a purity of 99% and an average particle diameter of 1.2 μm were added 20% by volume of TiN having an average particle diameter of 1.6 μm and 5% by volume of $CeO_2$ having an average particle diameter of 0.9 μm, and further a binder and a solvent were added. By using the resulting slurry, a green sheet having a thickness of 0.5 mm (sheet for forming a dielectric layer 8) was molded by a doctor blade method. This green sheet was laminated on a green sheet provided with a metallic film constituting the electrode 4 for electrostatic adsorption, and the sheets were heat-pressed at 80° C. under a pressure of 50 kg/cm² to for a laminate of the green sheets. Thereafter, the green sheet laminate was machined to form a circular plate, and the circular laminate was vacuum degreased, and fired at a firing temperature of about 2000° C. in a nitrogen atmosphere for 1 to several hours to produce a plate having an outer diameter of 200 mm and a thickness of 8 mm provided in the interior with an electrostatic adsorption electrode 7 having a film thickness of 15 μm. The surface of the aluminum nitride sintered body constituting the dielectric layer 8 on the electrode 7 was polished to form an adsorption surface 9 whereby an electrostatic chuck 5 in which the adsorption surface 9 comprises an aluminum nitride sintered body containing aluminum nitride as a main phase. 20% by volume of TiN and 5% by volume of Ce calculated as an oxide was produced.

Figure 6:
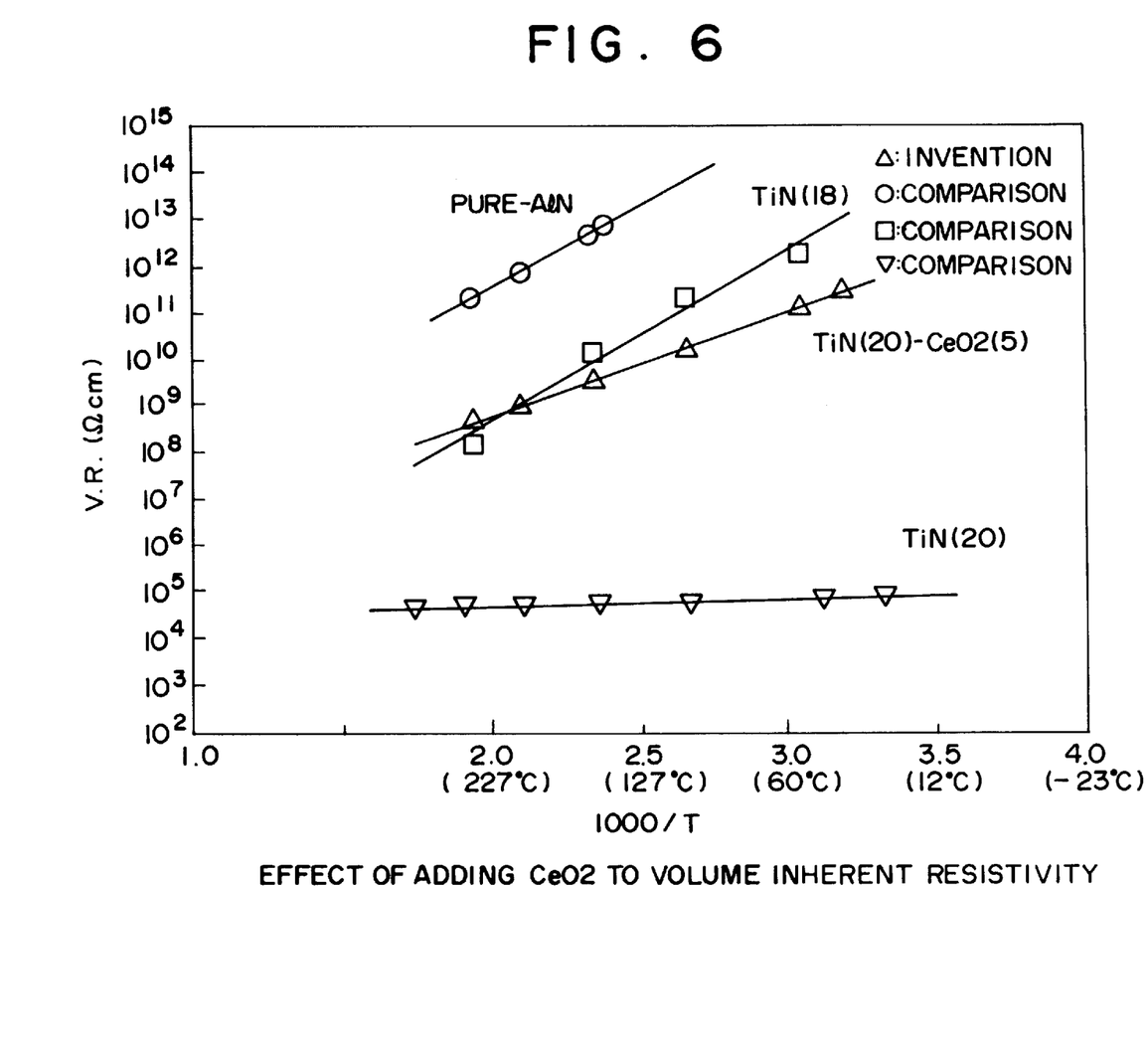
FIG. 6 is a diagram showing the relation between the temperatures of sintered bodies for forming a dielectric layer prepared by Examples 6 and 7 and the volume inherent resistivity values of the sintered bodies.

A sample (a disk having a diameter of 60 mm and a thickness of 2 mm) produced under the same conditions as the dielectric layer 8 was provided, and this sample was heated gradually from room temperature (25° C.) to 250° C. and the volume inherent resistivity value of this sample was measured by a three terminal method. The results are shown in FIG. 6. As is clear from FIG. 6, a proportional relation is established between an inverse number of temperature and a volume inherent resistivity value, and the volume inherent resistivity value of the aluminum nitride sintered body within a temperature range of −20 to 230° C. was $10^8$ to $10^{12}$ Ω·cm.

Figure 7:
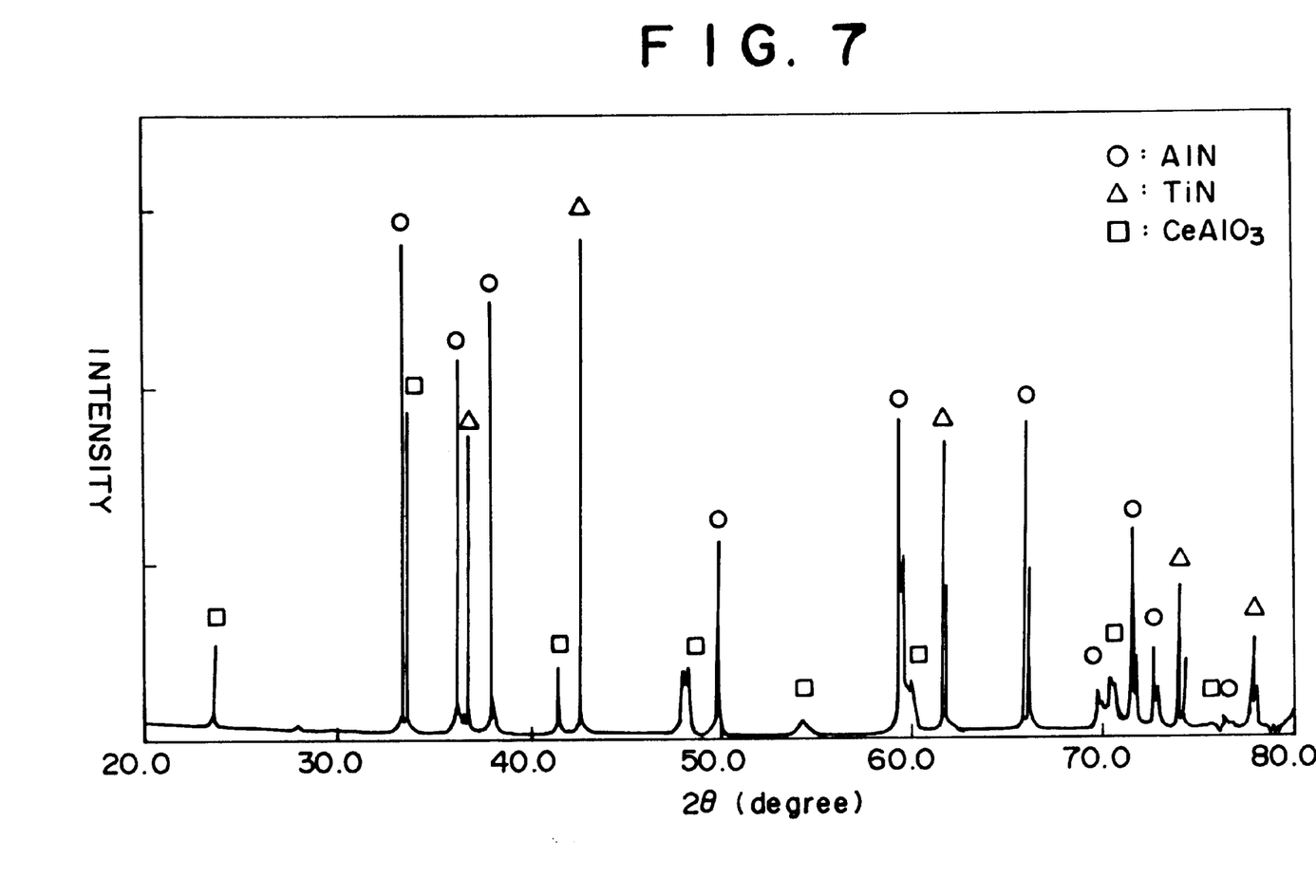
FIG. 7 shows an X-ray diffraction chart of the sintered body of this invention produced in Example 6.

Furthermore, this sample was measured by X-ray diffraction, and the state of cerium (Ce) in the sintered body was measured. The resulting X-ray diffraction chart is shown in FIG. 7. From FIG. 7, the precipitation of $CeAlO_3$ could be confirmed, and it was seen that cerium (Ce) existed as $CeAlO_3$ in the sintered body.

Then, at room temperature (25° C.) a silicon wafer having a diameter of 8 inches was placed on the adsorption surface 9 of the electrostatic chuck 5 produced by way of trial, and by imparting an electric voltage of 300 V between the electrode 7 and the silicon wafer, the silicon wafer 10 was adsorbed and held onto the adsorption surface 9. When the force required to peel off the silicon wafer from the adsorption surface was measured as an adsorption force, an adsorption force of 520 g/cm² was obtained.

As can be understood from FIG. 6, since in the electrostatic chuck 5 of the present invention, the dielectric layer 8 at a temperature range of −20 to 230° C. has a resistivity value of $10^8$ to $10^{12}$ Ω·cm, the electrostatic chuck 5 can be used over a wide temperature range.

EXAMPLE 7

Comparative Example (1) An aluminum nitride sintered body (not containing TiN and $CeAlO_3$) having the same material as the ceramic base late 6 of Example 6.

(2) A sintered body composed of 82% by volume of aluminum nitride and 18% by volume of TiN.

(3) A sintered body composed of 80% by volume of aluminum nitride and 20% by volume of TiN.

With respect to each of the above sintered bodies, in quite the same way as in Example 6, the relation between the temperature and the volume inherent resistivity value was measured, and the results are shown in FIG. 6.

Electrostatic chucks having the sintered bodies (1) to (3) as a dielectric layer 8 were prepared in the same manner as in Example 6. With respect to the resulting electrostatic chucks, an adsorption force required to peel off a silicon wafer was measured in the same manner as in Example 6.

Since the electrostatic chuck having the sintered body (1) as a dielectric layer had a resistivity value of at least $10^{16}$ $\Omega \cdot cm$ at room temperature (25° C.) (see FIG. 6), the adsorption force was as small as 10 g/cm$^2$.

Furthermore, since the electrostatic chuck having the sintered body (2) had a resistivity value of about $10^{13}$ $\Omega \cdot cm$ (see FIG. 6) at room temperature, the adsorption force was about 50 g/cm$^2$.

In the electrostatic chuck produced by using the sintered body (3), the adsorption force was about the same as the electrostatic chuck of the present invention produced in Example 6, but the resistivity value was as small as about $10^5$ $\Omega \cdot cm$. As a result, the leakage current was high, and was likely to give poor effects to the silicon wafer.

As is clear from FIG. 6, since the electrostatic chucks produced by using the sintered bodies (1) and (2) had great temperature changes of the resistivity values, they can be applied to only a narrow temperature range.

EXAMPLE 8

Aluminum nitride sintered bodies (in the form of disks having a diameter of 60 mm and a thickness of 2 mm) were produced by changing the contents (calculated as an oxide) of titanium nitride (TiN) and cerium (Ce). The volume inherent resistivity values of the resulting produces were measured by a three terminal method.

The results are shown in Table 3.

TABLE 3

| No. | Amount of AlN (vol. %) | Amount of TiN (vol. %) | Amount Ce (vol. %) | Resistivity value of AlN sintered body |
|---|---|---|---|---|
| 1 | 81 | 12 | 10 | o |
| *2 | 75 | 15 | 10 | o |
| 3 | 75 | 20 | 5 | o |
| 4 | 68 | 30 | 2 | o |
| *5 | 63 | 35 | 2 | X |
| 6 | 70 | 25 | 5 | o |
| 7 | 80 | 15 | 5 | o |
| *8 | 85 | 5 | 10 | X |

*Outside the range of this invention
(Note)
The resistivity values of AlN sintered bodies are indicated by o which shows that the resistivity value at a temperature of not higher than 200° C. is within $10^8$ to $10^{12}$ $\Omega \cdot cm$ and by X which shows that the resistivity value is not within the above range.

As a result, as can be seen from Table 3, since Sample No. 5 had a content of titanium nitride (TiN) greater than 30% by volume, the temperature change of the resistivity value could not be controlled by adding cerium (Ce). Thus, the sample had an excessively small volume resistivity value in an atmosphere at a temperature of not higher than 200° C., and the volume resistivity value could not be adjusted to $10^8$ to $10^{12}$ $\Omega \cdot cm$.

Furthermore, since Sample No. 8 contained less than 10% by volume of titanium nitride (TiN), an effect of sufficiently lowering the volume inherent resistivity value was small, and it was impossible to adjust the volume inherent resistivity value in an atmosphere at a temperature of not higher than 200° C. to $10^{12}$ $\Omega \cdot cm$ or below.

On the other hand, since Samples Nos. 1 to 4, 6 and 7 contained 10 to 30% by volume of titanium nitride (TiN) and 2 to 10% by volume of cerium (Ce) [calculated as an oxide], the volume inherent resistivity values in an atmosphere at a temperature of not higher than 200° C. could be adjusted to a range within $10^8$ to $10^{12}$ $\Omega \cdot cm$.

It can be understood from the above fact that when the electrostatic chuck in accordance with this invention is used, adsorption forces due to the Johnson-Rahbeck force can be obtained, articles such as a silicon wafer can be held with a high adsorption force.

EXAMPLE 9

To 65% by volume of AlN powder having a purity of 99% and an average particle diameter of 1.2 μm were added 30% by volume of TiN having an average particle diameter of 1.6 μm and 5% by volume of $Y_2O_3$ having an average particle diameter of 1 μm, and furthermore, a binder and a solvent were added. By using the resulting slurry, a green sheet having a thickness of about 0.5 mm was molded by a doctor blade method.

An electrostatic chuck was produced in the same way as in Example 6 except that a dielectric layer was formed by using this green sheet. The adsorption surface of this electrostatic chuck was composed of 65% by volume of AlN particles, 30% by volume of TiN particles, and 5% by volume of yttrium (Y) calculated as an oxide.

Figure 8:
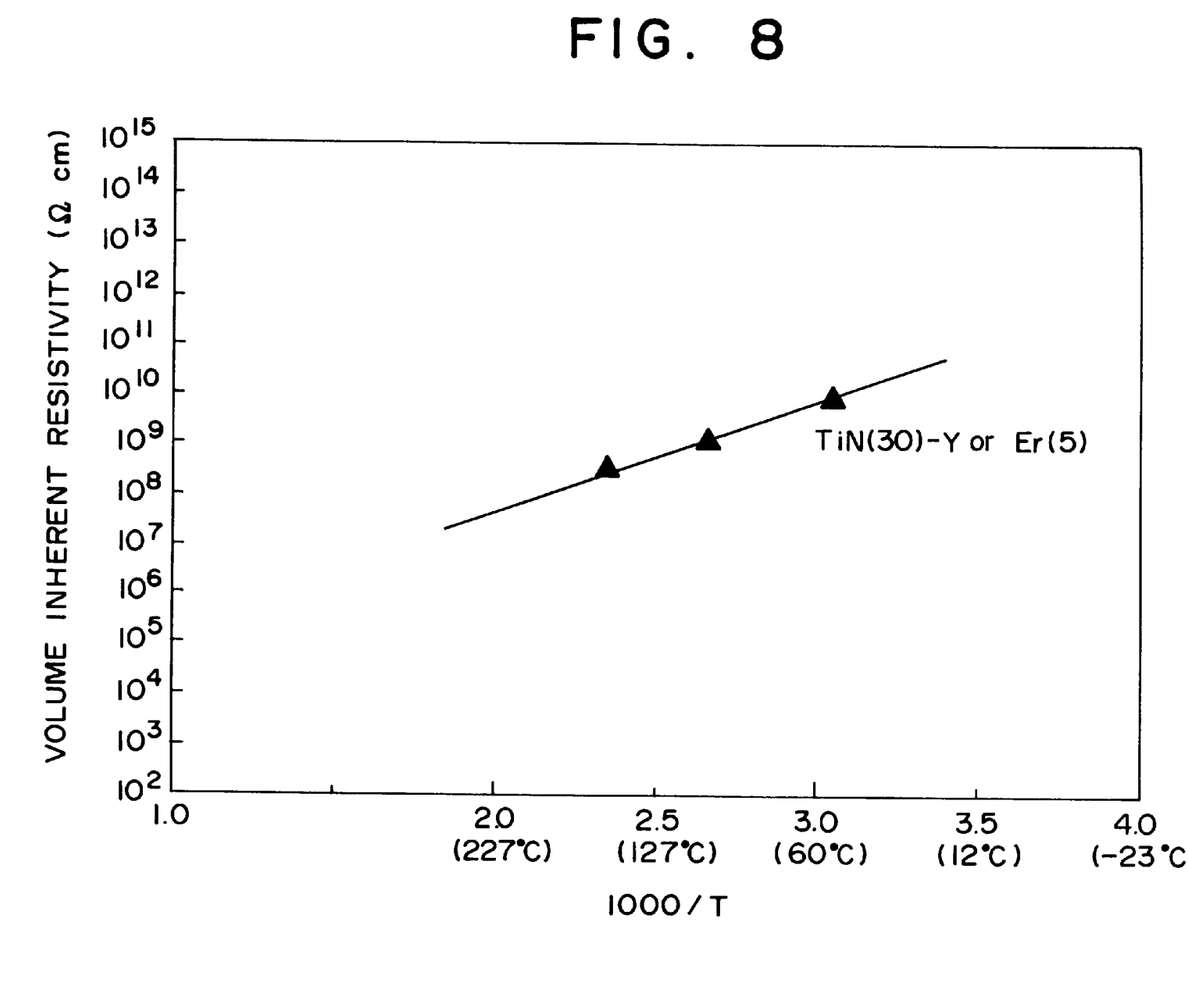
FIG. 8 is a diagram showing the relation between the temperatures of sintered bodies for forming a dielectric layer prepared in Example 9 and the volume inherent resistivity values of the sintered bodies.

With respect to a sample (a circular plate having a diameter of 60 mm and a thickness of 2 mm) produced under the same conditions as the above-mentioned dielectric layer, the volume inherent resistivity value was measured by a three terminal method at a temperature of −30° C. to 150° C., and the results are shown in FIG. 8. These results showed that a proportional relation was established between an inverse number of the temperature and a resistivity value, and the sample had a resistivity value of $10^8$ to $10^{12}$ $\Omega \cdot cm$ in a temperature range of −30° C. to 150° C.

With respect to the electrostatic chuck obtained above, an adsorption force required to peel off the silicon wafer in the same way as in Example 6 was measured. It showed a very large adsorption force of 500 g/cm$^2$ at room temperature (25° C.). Since the resistivity value of the dielectric layer in a temperature region of −30° C. to 150° C. was $10^8$ to $10^{12}$ $\Omega \cdot cm$ (see FIG. 8), it is understood that this electrostatic chuck can be used within a wide temperature range.

EXAMPLE 10

Aluminum nitride sintered bodies (disks having a diameter of 60 mm and a thickness of 2 mm) were produced by changing the contents (calculated as an oxide) of titanium nitride (TiN), yttrium (Y), erbium (Er) or ytterbium (Yb). The volume inherent resistivity values at room temperature (25° C.) of the resulting products were measured by a three terminal method.

The results are shown in Table 4.

TABLE 4

| No. | Amount of AlN (vol. %) | Amount of TiN (vol %) | Amount of $Y_2O_3$ (vol %) | Amount of $Er_2O_3$ (vol %) | Amount of $Yb_2O_3$ (vol. %) | Resisitivity value ($\Omega \cdot cm$) of the aluminum nitride sintered body |
|---|---|---|---|---|---|---|
| *1 | 81 | 12 | 10 | — | — | $2 \times 10^{14}$ |
| *2 | 75 | 15 | 10 | — | — | $3.5 \times 10^{13}$ |
| 3 | 75 | 20 | 5 | — | — | $3 \times 10^{11}$ |
| 4 | 68 | 30 | 2 | — | — | $2.5 \times 10^{11}$ |
| 5 | 63 | 35 | 2 | — | — | $9 \times 10^{10}$ |
| 6 | 70 | 25 | 5 | — | — | $5 \times 10^{11}$ |
| 7 | 80 | 15 | 5 | — | — | $7 \times 10^{14}$ |
| *8 | 85 | 5 | 10 | — | — | $>5 \times 10^{14}$ |
| *9 | 80 | 10 | 10 | — | — | $>5 \times 10^{14}$ |
| 10 | 75 | 24 | 1 | — | — | $5 \times 10^{8}$ |
| 11 | 70 | 26 | — | 4 | — | $8 \times 10^{11}$ |
| 12 | 75 | 23 | — | 2 | — | $1 \times 10^{11}$ |
| 13 | 70 | 26 | 2 | 2 | — | $7 \times 10^{11}$ |
| 14 | 75 | 20 | — | — | 5 | $5 \times 10^{11}$ |

*Outside the range of this invention.
(Note) The resistivity value of the aluminum nitride is taken at room temeprature (25° C.).

As a result, as can be seen from Table 4, since Samples Nos. 8 and 9 contained titanium nitride (TiN) in an amount of less than 12% by volume, the volume inherent resistivity value could not be adjusted to not higher than $10^{12}$ $\Omega \cdot cm$.

Furthermore, since Samples Nos. 1 and 2 contained yttrium (Y) in an amount of more than 8% by volume, the volume inherent resistivity value could not be adjusted to not larger than $10^{12}$ $\Omega \cdot cm$.

On the other hand, since Samples Nos. 3 to 7, and 10 to 14 contained 12 to 40% by volume of titanium nitride (TiN) and 1 to 8% by volume of at least one of yttrium (Y), erbium (Er) and ytterbium (Yb) (calculated as an oxide), the volume inherent resistivity values of the above Samples could be adjusted to $10^8$ to $10^{12}$ $\Omega \cdot cm$.

From the above fact, if the electrostatic chuck of this invention in which the dielectric layer constituting the adsorption surface is formed from the aluminum nitride sintered body containing aluminum nitride as a main phase and 12 to 40% by volume of titanium nitride and 1 to 8% by volume of at least one of yttrium, erbium and ytterbium (calculated as an oxide) is used, an adsorption force due to Johnson-Rahbeck force is obtained in various treating steps to be carried out in a temperature atmosphere near room temperature, it is understood that an article such as a wafer can be held with a high adsorption force.

EXAMPLE 11

To 81% by volume of AlN powder having a purity of 99% and an average particle diameter of 1.2 $\mu$m were added 15% by volume of TiN having an average particle diameter of 1.6 $\mu$m and 4% by volume of NiO having an average particle diameter of 0.8 $\mu$m, and furthermore, a binder and a solvent were added. By using the resulting slurry, a green sheet having a thickness of about 0.5 mm was molded by a doctor blade method.

An electrostatic chuck was produced exactly in the same way as in Example 6 except that a dielectric layer was formed by using this green sheet. The adsorption surface of this electrostatic chuck was composed of 81% by volume of AlN particles, 15% by volume of TiN particles and 4% of nickel (Ni) calculated as an oxide.

Figure 9:
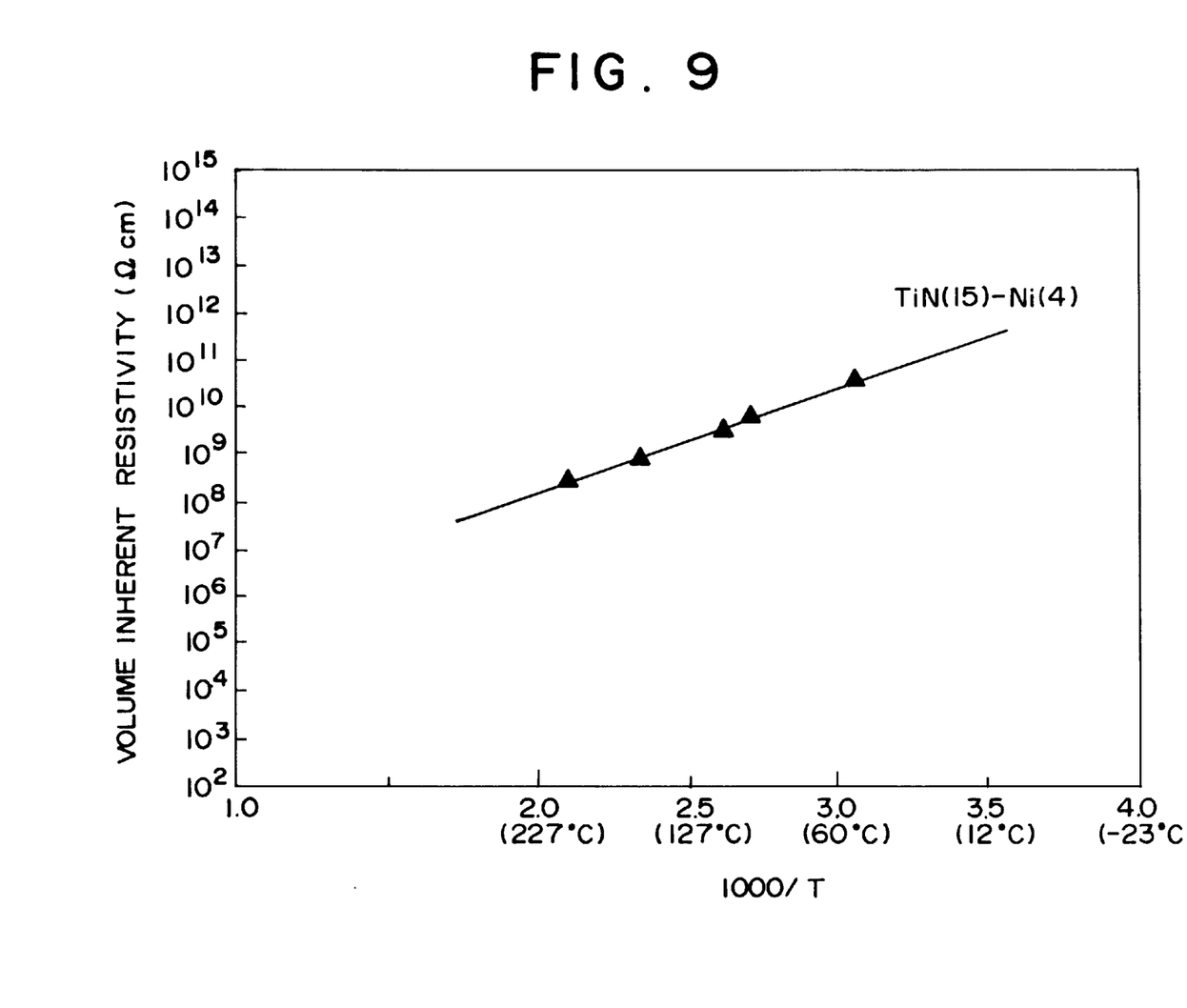
FIG. 9 is a diagram showing the relation between the temperatures of sintered bodies for forming a dielectric layer prepared in Example 11 and the volume inherent resistivity values of the sintered bodies.

With respect to a sample (a circular plate having a diameter of 60 mm and a thickness of 2 mm) produced under the same conditions as the dielectric layer, its volume inherent resistivity value was measured by a three terminal method, and the result is shwon in FIG. 9. It is understood from this result that an inverse number of temperature and a resistivity value constitute a proportional relation, and the sample has a resistivity value of $10^8$ to $10^{12}$ $\Omega \cdot m$.

Furthermore, with respect to the electrostatic chuck obtained above, an adsorption force required to peel off the silicon wafer was measured in the same way as in Example 6. The adsorption force of the chuck was as large as 600 g/cm$^2$ at room temperature (25° C.). Since the resistivity value of the dielectric layer was $10^8$ to $10^{12}$ $\Omega \cdot cm$ in a temperature range of 25 to 200° C. (see FIG. 9), it is understood that this electrostatic chuck can be used in a wide temperature range.

EXAMPLE 12

Aluminum nitride sintered bodies (in the form of a disk having a diameter of 60 mm and a thickness of 2 mm) in which the contents of titanium nitride (TiN) and nickel (Ni) (calculated as an oxide) were changed respectively were produced by way of trial, and the volume inherent resistivity values of the sintered bodies at room temperature (25° C.) were measured by a three terminal method.

The results are shown in Table 5.

TABLE 5

| No. | Amount of AlN (vol. %) | Amount of TiN (vol. %) | Amount of NiO (vol. %) | Resistivity of the aluminum nitride sintered body ($\Omega \cdot cm$) |
|---|---|---|---|---|
| 1 | 87 | 5 | 8 | $7 \times 10^{10}$ |
| 2 | 85 | 10 | 5 | $5 \times 10^{11}$ |
| 3 | 80 | 15 | 5 | $8 \times 10^{11}$ |
| *4 | 79.9 | 20 | 0.1 | $4 \times 10^{4}$ |
| 5 | 83 | 7 | 10 | $1 \times 10^{11}$ |
| 6 | 81.9 | 18 | 0.1 | $9 \times 10^{11}$ |
| *7 | 87 | 3 | 10 | $8 \times 10^{13}$ |
| *8 | 88.95 | 10 | 0.05 | $2.5 \times 10^{13}$ |
| *9 | 77.5 | 22 | 0.5 | $2 \times 10^{3}$ |
| *10 | 73 | 15 | 12 | $7 \times 10^{3}$ |

*indicates outside the range of the present invention.
(Note)
The resistivity of the aluminum nitride sintered body is measured at room temperature (25° C.).

As can be seen from Table 5, since Samples Nos. 4 and 9 contained titanium nitride (TiN) in an amount of more than 18% by volume, the volume inherent resistivity values of these samples were as small as not larger than $10^4$ $\Omega \cdot cm$, and could not be adjusted to at least $10^8$ $\Omega \cdot cm$.

Furthermore, since Sample No. 7 contained nickel (Ni) in an amount of smaller than 5% by volume, its volume inherent resistivity value was $8 \times 10^{13}$ $\Omega \cdot cm$, and could not be adjusted to not larger than $10^{12}$ $\Omega \cdot cm$.

On the other hand, since Sample No. 8 contained titanium nitride (TiN) in a range of 5 to 18% by volume but had a content of nickel (Ni) of less than 0.1% by volume, its volume inherent resistivity value could not be adjusted to not larger than $10^{12}$ $\Omega \cdot cm$. Since Sample No. 10 contained nickel (Ni) in an amount of more than 10% by volume, its volume inherent resistivity value as as small as $7 \times 10^3$ $\Omega \cdot cm$ and could not be adjusted to at least $10^8$ $\Omega \cdot cm$.

On the other hand, since Samples Nos. 1 to 3 and 5 and 6 contained 5 to 18% by volume of titanium nitride (TiN) and 0.1 to 10% by volume of nickel (Ni) (calculated as an oxide), the volume inherent resistivity values of these Samples could be controlled within a range of $10^8$ to $10^{12}$ $\Omega \cdot cm$.

From this fact, if the electrostatic chucks of this invention in which the dielectric layer constituting the adsorption surface is formed from the aluminum nitride sintered body containing aluminum nitride as a main phase and 5 to 18% by volume of titanium nitride and 0.1 to 10% by volume of nickel (calculated as an oxide) is used, an adsorption force due to Johnson-Rahbeck force is obtained in various treating steps to be carried out in a temperature atmosphere near room temperature, it is understood that an article such as a wafer can be held with a high adsorption force.

What is claimed:

1. A semi-insulating aluminum nitride sintered body comprising aluminum nitride sintered particles, electroconductive fine particles having a volume inherent resistivity value of not larger than $10^2$ Ω·cm which are dispersed among the aluminum nitride particles, and an intergranular phase formed from metallic silicon (Si) and/or an oxide containing at least one element selected from the group consisting of Ti, Ce, Ni, Ta, Y, Er, and Yb, wherein the sintered body has a resistivity value in the range of about $10^4$ to $10^{12}$ Ω·cm.

2. A semi-insulating aluminum nitride sintered body of claim 1 wherein the sintered body contains at least 55% by volume of the aluminum nitride particles.

3. A semi-insulating aluminum nitride sintered body comprising aluminum nitride sintered particles, electroconductive fine particles having a volume inherent resistivity value of not larger than $10^2$ Ω·cm which are dispersed among the aluminum nitride particles, and an intergranular phase formed from metallic silicon (Si) and/or an oxide containing at least one element selected from the group consisting of Ti, Ce, Ni, Ta, Y, Er, and Yb, wherein the electroconductive fine particles are present in an amount of from about 5 to 45% by volume.

4. A semi-insulating aluminum nitride sintered body of claim 1 wherein the intergranular phase is present in an amount of at least 0.1% by volume.

5. A semi-insulating aluminum nitride sintered body comprising aluminum nitride sintered particles, electroconductive fine particles having a volume inherent resistivity value of not larger than $10^2$ Ω·cm which are dispersed among the aluminum nitride particles, and an intergranular phase formed from metallic silicon (Si) and/or an oxide containing at least one element selected from the group consisting of Ti, Ce, Ni, Ta, Y, Er, and Yb, wherein the electroconductive fine particles comprise titanium nitride.

6. A semi-insulating aluminum nitride sintered body of claim 5 wherein the intergranular phase is formed from an oxide containing Ce.

7. A semi-insulating aluminum nitride sintered body of claim 6 wherein the electroconductive fine particles are present in a proportion of about 10 to 30% by volume, and Ce is present in a proportion of about 2 to 10% by volume in terms of the oxide.

8. A semi-insulating aluminum nitride sintered body of claim 5 wherein the intergranular phase is formed from an oxide containing Y, Er or Yb.

9. A semi-insulating aluminum nitride sintered body of claim 8 wherein the electroconductive fine particles are present in a proportion of about 12 to 40% by volume, and at least one of Y, Er or Yb is present in a proportion of about 1 to 8% by volume in terms of the oxide.

10. An electrostatic chuck for adsorbing and holding an article with electrostatic adsorption force, wherein an adsorbing and holding surface is formed from a semi-insulating aluminum nitride sintered body comprising aluminum nitride sintered particles, electroconductive fine particles having a volume inherent resistivity value of not larger than $10^2$ Ω·cm which are dispersed among the aluminum nitride particles, and an intergranular phase formed from metallic silicon (Si) and/or an oxide containing at least one element selected from the group consisting of Ti, Ce, Ni, Ta, Y, Er, and Yb.

11. A semi-insulating aluminum nitride sintered body of claim 1 wherein the intergranular phase is formed from metallic silicon (Si) and/or an oxide containing at least one element selected from the group consisting of Ti, Ce, Ni and Ta.

* * * * *